(12) United States Patent
Zhang et al.

(10) Patent No.: US 12,143,855 B2
(45) Date of Patent: Nov. 12, 2024

(54) ETHERNET HEADER COMPRESSION METHOD, ETHERNET HEADER DECOMPRESSION METHOD, AND DEVICE

(71) Applicant: VIVO MOBILE COMMUNICATION CO., LTD., Guangdong (CN)

(72) Inventors: Yanxia Zhang, Chang'an Dongguan (CN); Yumin Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 442 days.

(21) Appl. No.: 17/193,286

(22) Filed: Mar. 5, 2021

(65) Prior Publication Data

US 2021/0195463 A1    Jun. 24, 2021

Related U.S. Application Data

(63) Continuation of application No. PCT/CN2019/104649, filed on Sep. 6, 2019.

(30) Foreign Application Priority Data

Sep. 7, 2018    (CN) .......................... 201811046292.7

(51) Int. Cl.
*H04W 28/06* (2009.01)

(52) U.S. Cl.
CPC .................................. *H04W 28/06* (2013.01)

(58) Field of Classification Search
CPC . H04W 28/06; H04W 52/0229; H04W 48/08; H04W 36/0069; H04L 69/04
See application file for complete search history.

(56) References Cited

U.S. PATENT DOCUMENTS

| 8,160,106 B2* | 4/2012 | Valadarsky ............. H04L 69/04 370/521 |
| 2004/0090989 A1 | 5/2004 | Kobayashi |

(Continued)

FOREIGN PATENT DOCUMENTS

| CN | 103825869 A | 5/2014 |
| JP | 2004173229 A | 6/2004 |

(Continued)

OTHER PUBLICATIONS

IN Office Action in Application No. 20217015748 dated Feb. 8, 2022.

(Continued)

*Primary Examiner* — Syed Ali
(74) *Attorney, Agent, or Firm* — Price Heneveld LLP

(57) ABSTRACT

This disclosure provides an Ethernet header compression method, an Ethernet header decompression method, and a device. The compression method includes: transmitting, by using a transmitting PDCP entity of the transmitting end, a first PDCP PDU corresponding to a first data radio bearer DRB, where when the first DRB is configured with an Ethernet header compression function, the first PDCP PDU includes one or more pieces of first information, and the first information is used to indicate whether a specific Ethernet field in an Ethernet header of a first PDCP SDU corresponding to the first PDCP PDU is reused.

18 Claims, 8 Drawing Sheets

(56) References Cited

U.S. PATENT DOCUMENTS

| | | | | |
|---|---|---|---|---|
| 2005/0271066 | A1* | 12/2005 | Valadarsky | H04L 69/22 370/401 |
| 2012/0182891 | A1* | 7/2012 | Lee | H04L 43/04 370/252 |
| 2012/0275424 | A1 | 11/2012 | Chen et al. | |
| 2013/0114411 | A1* | 5/2013 | Aboul-Magd | H04L 47/32 370/235 |
| 2016/0174102 | A1 | 6/2016 | Asterjadhi et al. | |
| 2018/0212716 | A1* | 7/2018 | Sirotkin | H04L 1/203 |
| 2020/0113008 | A1* | 4/2020 | Luo | H04W 72/04 |
| 2020/0245189 | A1* | 7/2020 | Tang | H04L 1/1614 |
| 2020/0267650 | A1* | 8/2020 | Lee | H04W 52/0229 |
| 2020/0358558 | A1* | 11/2020 | Tang | H04L 5/006 |

FOREIGN PATENT DOCUMENTS

| | | |
|---|---|---|
| JP | 2013013001 A | 1/2013 |
| WO | 2011085632 A1 | 7/2011 |

OTHER PUBLICATIONS

Jaya Rao, et al., "Packet Duplication for URLLC in 5G: Architectural Enhancements and Performance Analysis," IEEE Network, vol. 32, Issue 2, pp. 32-40 (Apr. 2, 2018).

KR Office Action dated Feb. 24, 2023 as received in Application No. 10-2021-7009847.

"On the scope of study for NR Industrial IoT study" 3GPP TSG-RAN #81, Ericsson, TDOC RP-181882, Sep. 10, 2018.

JP Office Action in Application No. 2021-512884 Dated Apr. 25, 2022.

* cited by examiner

| D/C | R | R | R | PDCP serial number (PDCP SN) | Oct 1 |
| --- | --- | --- | --- | --- | --- |
| PDCP SN (cont.) | | | | | Oct 2 |
| Data (Data) | | | | | Oct 3 |

...

| Media access control information for user signaling data integrity (optional) (MAC-I) (optional) | Oct N-3 |
| --- | --- |
| MAC-I (cont.) (optional) | Oct N-2 |
| MAC-I (cont.) (optional) | Oct N-1 |
| MAC-I (cont.) (optional) | Oct N |

| D/C | F | R | R | PDCP serial number (PDCP SN) | Oct 1 |
|---|---|---|---|---|---|
| PDCP SN (cont.) | | | | | Oct 2 |
| Data (Data) | | | | | Oct 3 |

...

| Media access control information for user signaling data integrity (optional) (MAC-I) (optional) | Oct N-3 |
|---|---|
| MAC-I (cont.) (optional) | Oct N-2 |
| MAC-I (cont.) (optional) | Oct N-1 |
| MAC-I (cont.) (optional) | Oct N | ated
ETHERNET HEADER COMPRESSION METHOD, ETHERNET HEADER DECOMPRESSION METHOD, AND DEVICE

CROSS-REFERENCE TO RELATED APPLICATIONS

This application is a continuation application of International Application No. PCT/CN2019/104649 filed on Sep. 6, 2019, which claims priority to Chinese Patent Application No. 201811046292.7 filed with China on Sep. 7, 2018, which is incorporated herein by reference in its entirety.

TECHNICAL FIELD

Embodiments of this disclosure relate to the field of communications technologies, and in particular, to an Ethernet header compression method, an Ethernet header decompression method, and a device.

BACKGROUND

In Long Term Evolution (LTE) and New Radio (NR), the protocols specify that a header compression or header decompression function is performed by a Packet Data Convergence Protocol (PDCP) sublayer on a radio access network (RAN) side.

The header compression protocol is based on the Request for Comments (RFC) 9795 protocol developed by the Internet Engineering Task Force (IETF). The protocol defines a robust header compression (ROHC) framework. The ROHC framework has a plurality of header compression algorithms called profiles. Each profile is a combination of specific network layer, transport layer, and upper layer protocols, such as Transmission Control Protocol (TCP)/Internet Protocol (IP) and Real-Time Transport Protocol (RTP)/TCP/IP.

If the header compression function is configured, the header compression protocol produces the following two types of output packets:
 (1) Compressed packet, where each compressed packet is obtained through header compression processing on a PDCP service data unit (SDU); and
 (2) Interspersed ROHC feedback, which is not associated with the PDCP SDU, and is a PDCP control protocol data unit (PDU) generated by the PDCP layer.

The PDCP control PDU of the PDCP layer are used for two purposes: (1) for receiving a receiving status fed back by a PDCP entity; (2) for receiving a decompression status fed back by the PDCP entity. For a format of the interspersed ROHC feedback, refer to FIG. 1.

The Industrial Internet of Things (IIOT) project requires that Ethernet header compression can be performed on the RAN side. However, in the related art, the PDCP layer performing the header compression function does not support Ethernet header compression.

SUMMARY

According to a first aspect, an embodiment of this disclosure provides an Ethernet header compression method, applied to a transmitting end, and the method includes:
 transmitting, by using a transmitting packet data aggregation protocol PDCP entity of the transmitting end, a first PDCP PDU corresponding to a first data radio bearer DRB; where
 when the first DRB is configured with an Ethernet header compression function, a PDCP sub-header of the first PDCP PDU includes one or more pieces of first information, where the first information is used to indicate whether a specific Ethernet field in an Ethernet header of a first PDCP SDU is reused, and the first PDCP SDU corresponds to the first PDCP PDU.

According to a second aspect, an embodiment of this disclosure provides an Ethernet header decompression method, applied to a receiving end, and the method includes:
 receiving, by using a receiving PDCP entity of the receiving end, a first PDCP PDU corresponding to a first DRB; and
 performing Ethernet header decompression processing on the first PDCP PDU when the first DRB is configured with an Ethernet header compression function, where a PDCP sub-header of the first PDCP PDU includes one or more pieces of first information, and the first information is used to indicate whether a specific Ethernet field in an Ethernet header of a first PDCP SDU corresponding to the first PDCP PDU is reused.

According to a third aspect, an embodiment of this disclosure further provides a transmitting end, including:
 a first transmitting module, configured to transmit, by using a transmitting PDCP entity of the transmitting end, a first PDCP PDU corresponding to a first DRB, where
 when the first DRB is configured with an Ethernet header compression function, a PDCP sub-header of the first PDCP PDU includes one or more pieces of first information, where the first information is used to indicate whether a specific Ethernet field in an Ethernet header of a first PDCP SDU corresponding to the first PDCP PDU is reused.

According to a fourth aspect, an embodiment of this disclosure further provides a receiving end, including:
 a third receiving module, configured to receive, by using a receiving PDCP entity of the receiving end, a first PDCP PDU corresponding to a first DRB; and
 a decompression module, configured to perform Ethernet header decompression processing on the first PDCP PDU when the first DRB is configured with an Ethernet header compression function, where
 a PDCP sub-header of the first PDCP PDU includes one or more pieces of first information, and the first information is used to indicate whether a specific Ethernet field in an Ethernet header of a first PDCP SDU corresponding to the first PDCP PDU is reused.

According to a fifth aspect, an embodiment of this disclosure further provides a transmitting end, including a processor, a memory, and a program stored in the memory and capable of running on the processor, where when the program is executed by the processor, the steps of the Ethernet header compression method according to the first aspect are implemented.

According to a sixth aspect, an embodiment of this disclosure further provides a receiving end, including a processor, a memory, and a program stored in the memory and capable of running on the processor, where when the program is executed by the processor, the steps of the Ethernet header decompression method according to the second aspect are implemented.

According to a seventh aspect, an embodiment of this disclosure further provides a computer-readable storage medium, where the computer-readable storage medium stores a program, and when the program is executed by a processor, the steps of the Ethernet header compression method or the Ethernet header decompression method according to the first aspect or the second aspect are implemented.

BRIEF DESCRIPTION OF DRAWINGS

Other advantages and benefits will become apparent to those of ordinary skill in the art by reading detailed description of the optional embodiments below. The accompanying drawings are merely intended to illustrate the objectives of the optional embodiments and are not intended to limit this disclosure. Throughout the accompanying drawings, the same reference numerals represent the same components. In the drawings.

DESCRIPTION OF EMBODIMENTS

Figure 1:
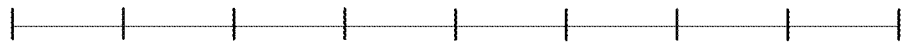
FIG. 1 is a schematic diagram of an interspersed ROHC feedback format in the related art.

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

In the specification and claims of this application, the term "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in the specification and claims, the use of "and/or" represents presence of at least one of the connected objects, for example, "A and/or B" indicates that the following three cases: only A, only B, or both A and B.

In the embodiments of this disclosure, the terms "an example" or "for example" are used to represent an example, an illustration, or a description. Any embodiment or design solution described as "an example" or "for example" in the embodiments of this disclosure should not be construed as preferred or advantageous over other embodiments or design solutions. To be precise, the terms, such as "an example" or "for example", are intended to present a related concept in a specific manner.

Techniques described in this specification are not limited to a Long Term Evolution (LTE)/LTE-Advanced (LTE-A) system, and can also be used in various wireless communications systems, such as code division multiple access (CDMA), time division multiple access (TDMA), frequency division multiple access FDMA), orthogonal frequency division multiple access (OFDMA), single-carrier frequency-division multiple access (SC-FDMA), and other systems, for example, a fifth generation mobile communications (5th-generation, 5G) system and a later evolved communications system.

The terms "system" and "network" are usually used interchangeably. The CDMA system can implement radio technologies such as CDMA2000 and universal terrestrial radio access (UTRA). The UTRA includes wideband CDMA (WCDMA) and other CDMA variants. The TDMA system can implement radio technologies such as the global system for mobile communications (GSM). The OFDMA system may implement radio technologies such as ultra mobile broadband (UMB), evolved-UTRA (E-UTRA), IEEE 802.11 (Wi-Fi), IEEE 802.16 (WiMAX), IEEE 802.20, or Flash-OFDM. The UTRA and E-UTRA are parts of the universal mobile telecommunications system (UMTS). LTE and advanced LTE (such as LTE-A) are new UMTS versions that use E-UTRA. UTRA, E-UTRA, UMTS, LTE, LTE-A, and GSM are cited from descriptions in the documentation of the organization named "3rd Generation Partnership Project" (3GPP). The CDMA2000 and UMB are cited from descriptions in the documentation of the organization named "3rd Generation Partnership Project 2" (3GPP2). Techniques described in this specification can be used in the systems and radio technologies mentioned above, and can also be used in other systems and radio technologies.

The following describes the embodiments of this disclosure with reference to the accompanying drawings. An Ethernet header compression method, an Ethernet header decompression method, and a device provided in the embodiments of this disclosure may be applied to a wireless communications system.

Figure 2:
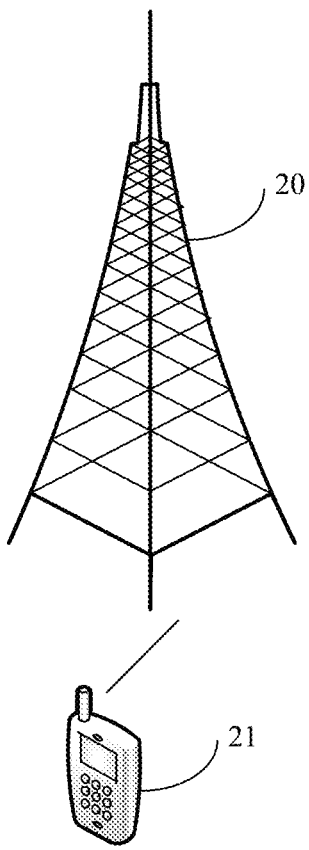
FIG. 2 is a schematic architectural diagram of a wireless communications system according to an embodiment of this disclosure.

FIG. 2 is a schematic architectural diagram of a wireless communications system according to an embodiment of this disclosure. As shown in FIG. 2, the wireless communications system may include a network device 20 and a terminal. The terminal is denoted as user equipment (UE) 21, and the UE 21 may communicate (transmit signaling or transmit data) with the network device 20. In an actual application, connection between the foregoing devices may be wireless connection. To conveniently and intuitively represent a connection relationship between the devices, a solid line is used for illustration in FIG. 2. It should be noted that the communications system may include a plurality of UEs 21, and the network device 20 may communicate with the plurality of UEs 21.

The terminal provided in the embodiments of this disclosure may be a mobile phone, a tablet computer, a notebook computer, an ultra-mobile personal computer (UMPC), a netbook, a personal digital assistant (PDA), a mobile Internet device (MID), a wearable device, an in-vehicle device, or the like.

The network device 20 provided in the embodiments of this disclosure may be a base station, and the base station may be a base station commonly used, or may be an evolved base station (eNB), or may be a network device in the 5G system, for example, a device (such as a next-generation base station (gNB) or a transmission and reception point (TRP)).

Figure 3:
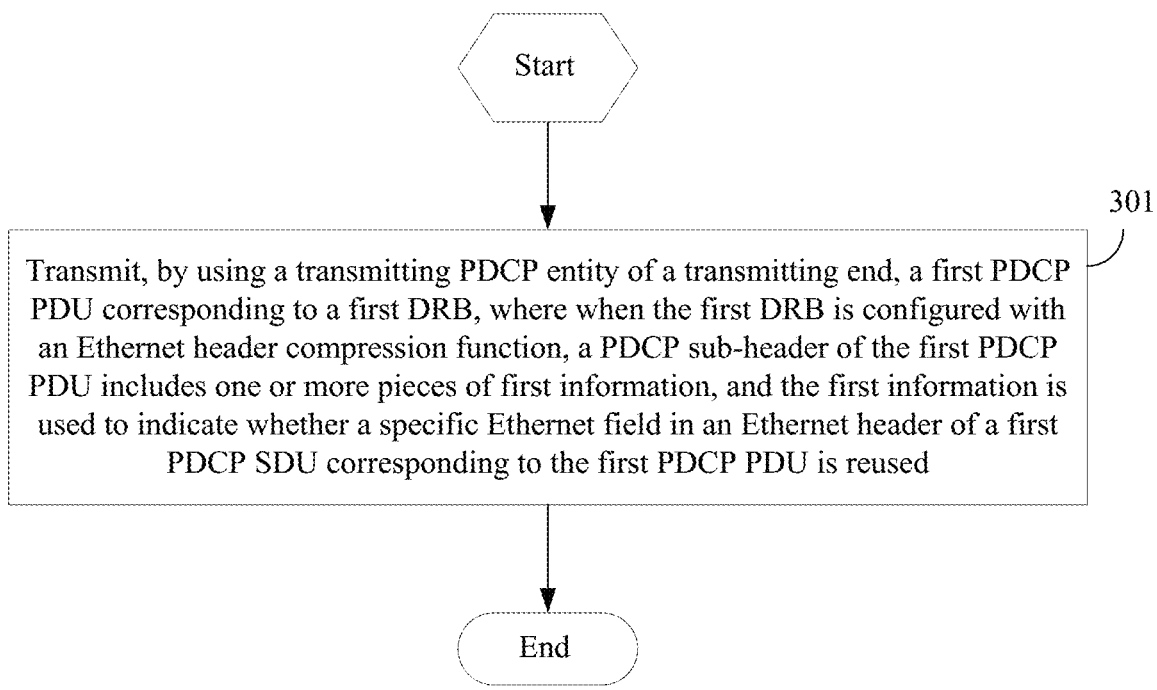
FIG. 3 is a flowchart of an Ethernet header compression method according to an embodiment of this disclosure.

Referring to FIG. 3, an embodiment of this disclosure provides an Ethernet header compression method. The method is executed by a transmitting end, and the transmitting end may be a terminal or a network device. The specific steps are as follows:

Step 301: Transmit, by using a transmitting PDCP entity of the transmitting end, a first PDCP PDU corresponding to a first data radio bearer (DRB).

When the first DRB is configured with an Ethernet header compression function, a PDCP sub-header of the first PDCP PDU includes one or more pieces of first information, where the first information is used to indicate whether a specific Ethernet field in an Ethernet header of a first PDCP SDU corresponding to the first PDCP PDU is reused.

A specific Ethernet field (or referred to as a specific field in an Ethernet frame header) may be a field for implementing an Ethernet function in an Ethernet frame format, and the specific Ethernet field includes but is not limited to a media access control (MAC) destination address, a source MAC address, a type, a virtual local area network tag (VLAN tag), and the like.

The first information indicates that the specific Ethernet field in the Ethernet header of the first PDCP SDU corresponding to the first PDCP PDU is reused. For example, if a value of the first information is "1", it indicates that the Ethernet field corresponding to the first information is the same as an Ethernet field carried in a data field of a data packet previously transmitted, and a data field of the first PDCP PDU may not carry the Ethernet field.

The first information indicates that the specific Ethernet field in the Ethernet header of the first PDCP SDU corresponding to the first PDCP PDU is not reused. For example, if the value of the first information is "0", it indicates that the data field of the first PDCP PDU carries the Ethernet field corresponding to the first information.

In this embodiment of this disclosure, optionally, when the transmitting end is a terminal, before the transmitting, by using a transmitting PDCP entity of the transmitting end, a first PDCP PDU corresponding to a first DRB, the method further includes: receiving a configuration message; where the configuration message includes any combination of one or more of the following: second information, used for indicating to configure an Ethernet header compression function of a second DRB; and third information, used for indicating to disable an Ethernet header compression function of a third DRB.

The Ethernet header compression function is configured when the second DRB is established. The Ethernet header compression function is disabled when the third DRB is released.

A time point for enabling the Ethernet header compression function of the second DRB is any time point after the second DRB is established; and a time point for disabling the Ethernet header compression function of the third DRB is any time point before the third DRB is released.

The Ethernet header compression function is not configured for the second DRB when a receiving PDCP entity corresponding to the second DRB is configured with an out-of-order delivery function.

Optionally, the configuration message may be a radio resource control (RRC) reconfiguration message, which is not limited thereto. The network device that delivers the RRC reconfiguration message may be a serving base station in a single connectivity structure, or may be a primary node or a secondary node in a dual connectivity (DC) architecture (if a signaling radio bearer 3 (SRB3) is configured).

In this embodiment of this disclosure, optionally, after the transmitting, by using a transmitting PDCP entity of the transmitting end, a first PDCP PDU corresponding to a first DRB, the method further includes: receiving, by using a receiving PDCP entity of the transmitting end, Ethernet header decompression status feedback information.

In this embodiment of this disclosure, optionally, after the receiving, by using a receiving PDCP entity of the transmitting end, Ethernet header decompression status feedback information, the method further includes: if the Ethernet header decompression status feedback information indicates that the Ethernet header is not successfully decompressed, transmitting a second PDCP PDU, where a PDCP sub-header of the second PDCP PDU includes one or more pieces of fifth information, and the fifth information is used to indicate that a specific Ethernet field in an Ethernet header of a second PDCP SDU is not reused, and the second PDCP SDU corresponds to the second PDCP PDU.

Figure 8:
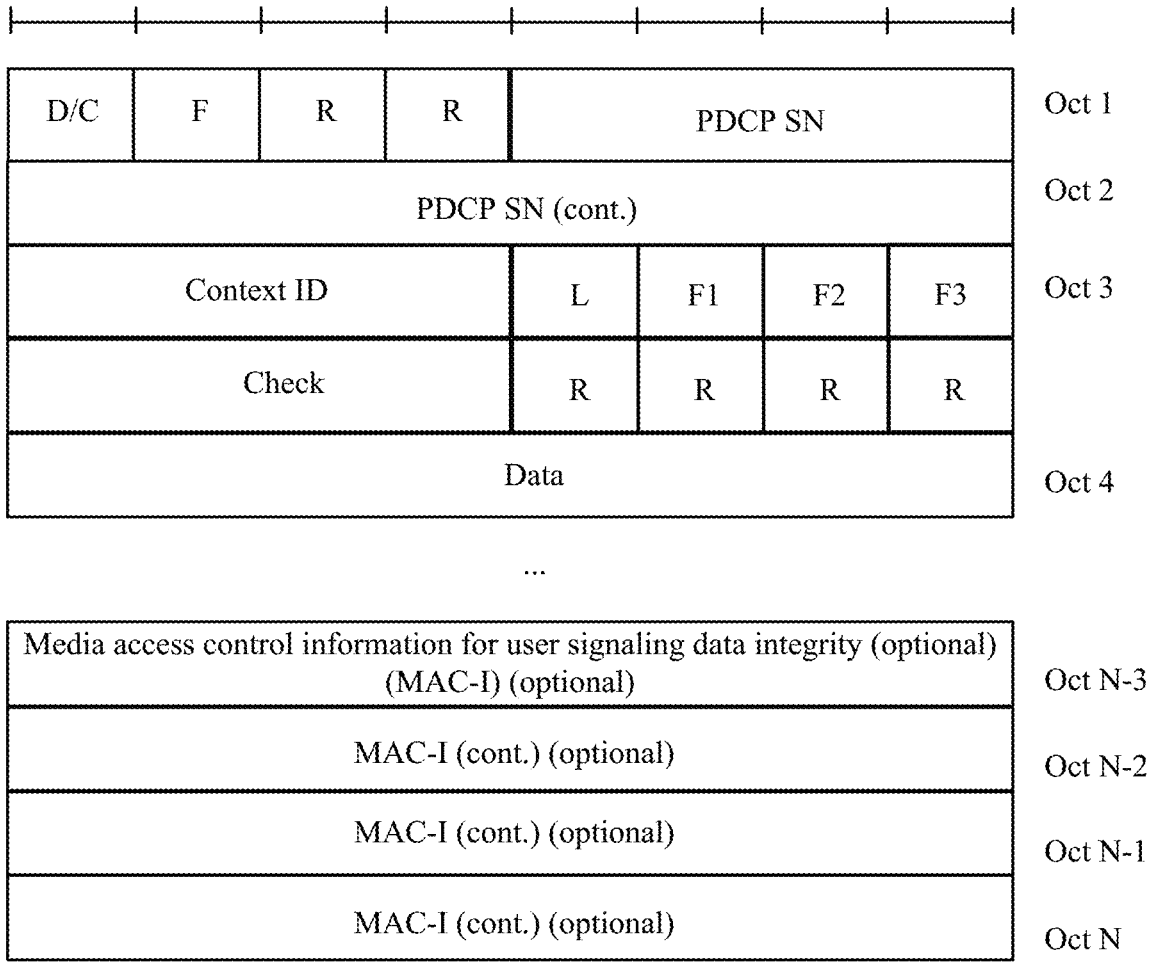
FIG. 8 is a schematic diagram 3 of a PDCP data PDU according to an embodiment of this disclosure.

In this embodiment of this disclosure, optionally, the PDCP sub-header of the first PDCP PDU further includes one or more of the following:

sixth information, used for identifying a data stream corresponding to the first PDCP PDU;

seventh information, used for indicating a length of bytes newly added relative to a legacy PDCP sub-header;

eighth information, used for verifying the Ethernet field; and ninth information, used for indicating whether an Ethernet header compression function is performed on the first PDCP PDU. Referring to FIG. 8, the F field is used to indicate whether the Ethernet header compression function is performed on the first PDCP PDU. For example, a value "0" indicates that the Ethernet header compression function is not performed on the first PDCP PDU, and a value "1" indicates that the Ethernet header compression function is performed on the first PDCP PDU.

In this embodiment of this disclosure, optionally, the eighth information is obtained through calculation by using a specific algorithm based on all Ethernet fields in the Ethernet header of the first PDCP SDU, and the specific algorithm is defined by the protocol or configured through negotiation between a network device and a terminal.

Figure 6:
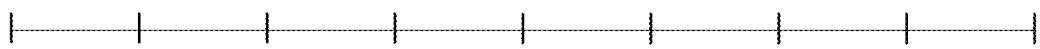
FIG. 6 is a schematic diagram 2 of a PDCP data PDU according to an embodiment of this disclosure.

In this embodiment of this disclosure, optionally, a format of the first PDCP PDU is a legacy PDCP data format when the Ethernet header compression function is disabled for the first DRB, as shown in FIG. 6.

Figure 9:
FIG. 9 is a schematic diagram 4 of a PDCP data PDU according to an embodiment of this disclosure.

In this embodiment of this disclosure, optionally, when the Ethernet header compression function is disabled for the first DRB, the PDCP sub-header of the first PDCP PDU includes tenth information used for indicating whether the Ethernet header compression function is performed on the first PDCP PDU. Referring to FIG. 9, the F field is used to indicate whether the Ethernet header compression function is performed on the first PDCP PDU. For example, a value "0" indicates that the Ethernet header compression function is not performed on the first PDCP PDU, and a value "1" indicates that the Ethernet header compression function is performed on the first PDCP PDU.

In this embodiment of this disclosure, compression can be performed on the Ethernet header to reduce overheads of the header. In addition, based on a feedback of the receiving end, it can be ensured that a compressor and a decompressor are synchronized and a correct Ethernet header is obtained through decompression.

Figure 4:
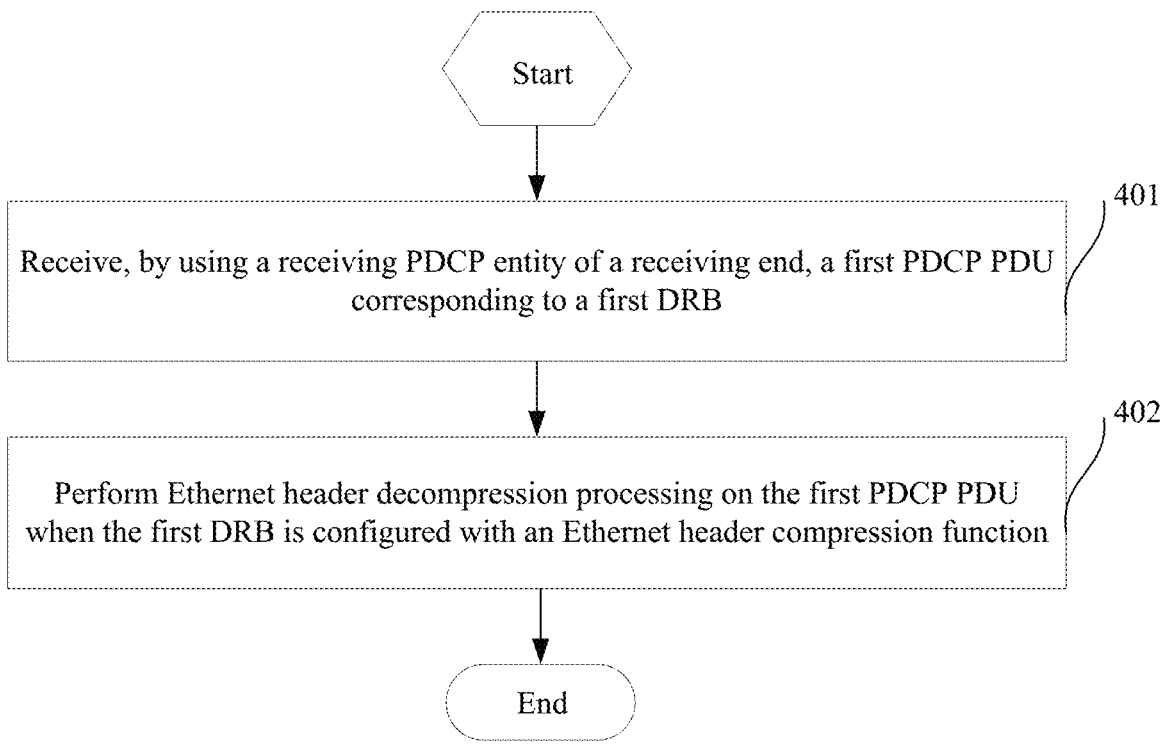
FIG. 4 is a flowchart of an Ethernet header decompression method according to an embodiment of this disclosure.

Referring to FIG. 4, an embodiment of this disclosure provides an Ethernet header decompression method. The method is executed by a receiving end, and the receiving end may be a terminal or a network device. The specific steps are as follows:

Step 401: Receive, by using a receiving PDCP entity of the receiving end, a first PDCP PDU corresponding to a first DRB.

Step 402: Perform Ethernet header decompression processing on the first PDCP PDU when the first DRB is configured with an Ethernet header compression function.

A PDCP sub-header of the first PDCP PDU includes one or more pieces of first information, and the first information is used to indicate whether a specific Ethernet field in an Ethernet header of a first PDCP SDU corresponding to the first PDCP PDU is reused.

In this embodiment of this disclosure, optionally, after the performing Ethernet header decompression processing on the first PDCP PDU, the method further includes: feeding back Ethernet header decompression status feedback information by using a transmitting PDCP entity of the receiving end.

In this embodiment of this disclosure, optionally, when the receiving end is a network device, before the receiving, by using a receiving PDCP entity of the receiving end, a first PDCP PDU corresponding to a first DRB, the method further includes: transmitting a configuration message; where the configuration message includes any combination of one or more of the following: second information, used for indicating to configure an Ethernet header compression function of a second DRB; and third information, used for indicating to disable an Ethernet header compression function of a third DRB.

The Ethernet header compression function is configured when the second DRB is established. The Ethernet header compression function is disabled when the third DRB is released.

A time point for enabling the Ethernet header compression function of the second DRB is any time point after the second DRB is established; and a time point for disabling the Ethernet header compression function of the third DRB is any time point before the third DRB is released.

The Ethernet header compression function is not configured for the second DRB when a receiving PDCP entity corresponding to the second DRB is configured with an out-of-order delivery function.

Optionally, the configuration message may be an RRC reconfiguration message, which is certainly not limited thereto.

In this embodiment of this disclosure, optionally, the PDCP sub-header of the first PDCP PDU further includes one or more of the following:
 sixth information, used for identifying a data stream corresponding to the first PDCP PDU;
 seventh information, used for indicating a length of bytes newly added relative to a legacy PDCP sub-header;
 eighth information, used for verifying the Ethernet field; and
 ninth information, used for indicating whether the Ethernet header compression function is performed on the first PDCP PDU. Referring to FIG. 8, the F field is used to indicate whether the Ethernet header compression function is performed on the first PDCP PDU. For example, a value "0" indicates that the Ethernet header compression function is not performed on the first PDCP PDU, and a value "1" indicates that the Ethernet header compression function is performed on the first PDCP PDU.

In this embodiment of this disclosure, optionally, the performing Ethernet header decompression processing on the first PDCP PDU includes at least one of the following:
 establishing an Ethernet header decompression context associated with the sixth information;
 performing verification on the eighth information based on an Ethernet field carried in a data field of the first PDCP PDU;
 if verification on the eighth information is successful, obtaining the Ethernet header of the first PDCP SDU based on the Ethernet field carried in the data field of the first PDCP PDU, and updating the Ethernet header decompression context;
 or
 obtaining a reused Ethernet field in the Ethernet header of the first PDCP SDU from the Ethernet header decompression context corresponding to the sixth information;
 performing verification on the eighth information based on the reused Ethernet field in the Ethernet header of the first PDCP SDU and the Ethernet field carried in the data field of the first PDCP PDU; and
 if verification on the eighth information is successful, obtaining the Ethernet header of the first PDCP SDU based on the reused Ethernet field in the Ethernet header of the first PDCP SDU and the Ethernet field carried in the data field of the first PDCP PDU, and updating the Ethernet header decompression context corresponding to the sixth information.

The Ethernet header decompression context may be used as historical information for decompressing a next packet.

In this embodiment of this disclosure, the transmitting end can perform compression on the Ethernet header to reduce overheads of the header. In addition, based on a feedback from the receiving end, it can be ensured that a compressor and a decompressor are synchronized and a correct Ethernet header is obtained through decompression.

The following describes Ethernet header compression and an Ethernet header decompression processing procedures in the embodiments of this disclosure with reference to Example 1 and Example 2.

Example 1

Step 1: A network device transmits a radio resource control (RRC) reconfiguration message to a transmitting end, where the RRC reconfiguration message includes any combination of one or more of the following:
 first information that indicates a data radio bearer (DRB) configured with an Ethernet header compression function; and
 second information that indicates a DRB for which an Ethernet header compression function is disabled.

Reconfiguring the Ethernet header compression function for one DRB occurs in the following scenarios:
 The Ethernet header compression function is configured when the DRB is established, or the Ethernet header compression function is disabled when the DRB is released.

If a PDCP entity corresponding to the DRB is configured with an out-of-order delivery function, the Ethernet header compression function is not configured for the DRB.

The network device that delivers the RRC reconfiguration message may be a serving base station in a single connectivity structure, or may be a primary node or a secondary node in a dual connectivity (DC) architecture (if a signaling radio bearer 3 (SRB3) is configured).

Step 2: The transmitting end receives the RRC reconfiguration message delivered by the network device, and applies the RRC reconfiguration message.

When data corresponding to the DRB is received from an upper layer (for example, service discovery application profile (SDAP)), the corresponding processing behavior is as follows:

Step 2.1: If the DRB is configured with the Ethernet header compression function, when the PDCP entity corresponding to the DRB transmits a PDCP PDU, (one or more) bytes are added to a PDCP sub-header of the PDCP PDU relative to a legacy PDCP data format, where the bytes are used to indicate a reuse status of an Ethernet field in an Ethernet header of a PDCP SDU corresponding to the PDCP PDU.

Figure 5:
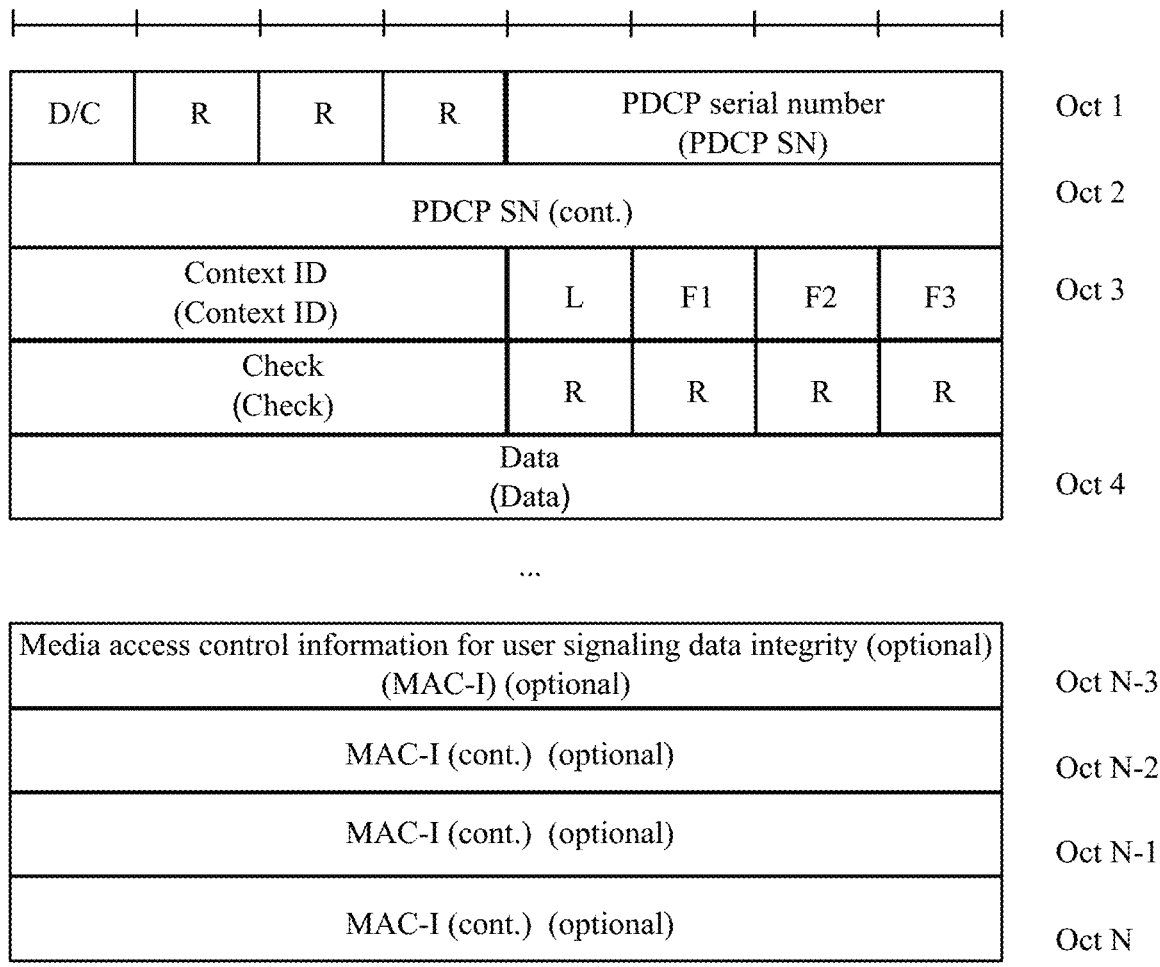
FIG. 5 is a schematic diagram 1 of a PDCP data PDU according to an embodiment of this disclosure.

For the PDCP PDU format, refer to FIG. 5. FIG. 5 uses an example that a PDCP serial number (SN) size is equal to 12 bits, to illustrate the corresponding PDCP data PDU format.

Context ID has a value range of [0, maxethernetID-1], where a maximum Ethernet ID (maxethernet ID) may be configured by using RRC. The Context ID field uniquely identifies one data stream, for example, identifies a data stream corresponding to a specific media access control (MAC) source address or destination MAC address (destination address) combination, and the Context ID is associated with a compression context corresponding to the specific source MAC address or destination MAC address combination.

The L field is used to indicate a length of newly added (or additionally introduced) bytes relative to a legacy PDCP sub-header.

The Check field is used to verify the Ethernet field, to ensure that the receiving end can successfully obtain a correct Ethernet header through decompression. The Check field is obtained through calculation by using a specific algorithm based on all Ethernet fields in the Ethernet header of the first PDCP SDU, and the specific algorithm is defined by the protocol or configured through negotiation between the network device and the transmitting end.

The F1, F2, or F3 field is used to indicate whether a specific Ethernet field in the Ethernet header of the PDCP SDU is reused. For example, F1 corresponds to the source MAC address field in the Ethernet header, F2 corresponds to the destination MAC address field in the Ethernet header, and F3 corresponds to the type field in the Ethernet header.

For example, when a value of the F1, F2, or F3 field is "1", it indicates that the F1, F2, or F3 field is reused. It can be understood that if an Ethernet field in a data packet transmitted this time is the same as an Ethernet field in a previous data packet, a corresponding Ethernet field is no longer carried in the Ethernet header of the data packet transmitted this time.

When the value of the F1, F2, or F3 field is "0", it indicates that the Ethernet field corresponding to the F1, F2, or F3 field is not reused, and a corresponding Ethernet field is carried in the Ethernet header of the data packet transmitted this time.

Step 2.2: If the Ethernet header compression function is disabled for one DRB, a PDCP entity corresponding to the DRB performs data transmission in the legacy PDCP data PDU format.

For example, the PDCP SN size is equal to 12 bits, and the corresponding PDCP data PDU format is shown in FIG. 6.

Step 3: The receiving PDCP entity receives data corresponding to one DRB from a bottom layer (for example, radio link layer control protocol (Radio Link Control, RLC)). If the DRB is configured with the Ethernet header compression function, when it is determined to deliver the data packet to the upper layer (for example, SDAP), the Ethernet header is decompressed, and the corresponding processing behavior is as follows:

Step 3.1: If a corresponding Ethernet decompression context has not been established for a context ID carried in a header of the PDCP data PDU, establish the Ethernet header decompression context and associate the Ethernet header decompression context with the context ID; and if verification of the check field is successful, obtain an original Ethernet header based on the Ethernet field carried in the header of the PDCP data PDU, and update the Ethernet header decompression context.

Step 3.2: If the receiving PDCP entity has established a corresponding Ethernet decompression context for the context ID carried in the header of the PDCP data PDU, extract a stored reused Ethernet field from the decompression context corresponding to the context ID, and verify the check field based on the reused Ethernet field and an un-reused Ethernet field carried in the PDCP SDU; and if verification of the check field is successful, obtain the original Ethernet header, and update the decompression context corresponding to the context ID.

Step 3.3: The receiving PDCP entity feeds back Ethernet header decompression status feedback information to the transmitting PDCP entity.

Figure 7:
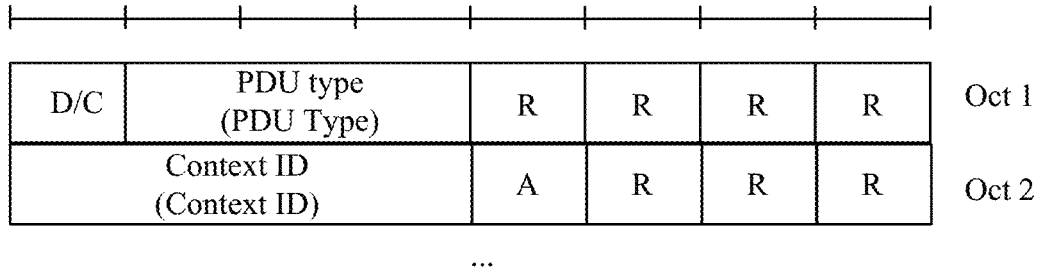
FIG. 7 is a schematic diagram of a PDCP control PDU according to an embodiment of this disclosure.

For the Ethernet header decompression status feedback information, refer to FIG. 7. FIG. 7 illustrates a PDCP control PDU for Ethernet.

Context ID uniquely identifies a specific MAC source or MAC destination combination.

The A field indicates whether the receiving PDCP entity has successfully decompressed the Ethernet header. For example, a value of the A field being "1" indicates successful decompression, and the value of the A field being "0" indicates a decompression failure.

Step 4: The transmitting PDCP entity receives, from the bottom layer, a PDCP control PDU that contains an Ethernet header compression feedback, and the corresponding processing behavior is as follows:

If the feedback indicates that the Ethernet header has not been successfully decompressed, the transmitting PDCP entity needs to reset all Ethernet reuse indicator fields, for example, sets to 0.

Example 2

Step 1: The network device transmits an RRC reconfiguration message to the transmitting end, where the RRC reconfiguration message includes any combination of one or more of the following:
   first information that indicates a data radio bearer (DRB) configured with an Ethernet header compression function; and
   second information that indicates a DRB for which an Ethernet header compression function is disabled.

Reconfiguring the Ethernet header compression function for one DRB occurs only in the following scenarios:

enabling the Ethernet header compression function for one DRB may occur at any time point after the DRB is established; and disabling the Ethernet header compression function for one DRB may occur at any time point before the DRB is released.

If a PDCP entity corresponding to one DRB is configured with an out-of-order delivery function, the Ethernet header compression function is not configured for the DRB.

The network device that delivers the RRC reconfiguration message may be a serving base station in a single connectivity structure, or may be a primary node or a secondary node in a dual connectivity architecture (if an SRB3 is configured).

Step 2: The transmitting end receives the RRC reconfiguration message delivered by the network device, and applies the reconfiguration message.

When data corresponding to one DRB is received from an upper layer (SDAP), the corresponding processing behavior is as follows:

Step 2.1: If the DRB are configured with the Ethernet header compression function, when a PDCP entity corresponding to the DRB transmits data, (one or more) bytes are added to a PDCP sub-header relative to a legacy PDCP data PDU format, where the bytes are used to indicate a reuse status of a field carried in the Ethernet header. An example of the corresponding PDCP data PDU format is as follows:

For example, a PDCP SN size is equal to 12 bits, and the corresponding PDCP data PDU format is shown in FIG. 8.

The F field is used to indicate whether the Ethernet header compression function is performed on the data packet. For example, a value of the F field being "0" indicates that the Ethernet header compression function is not performed, and the value of the F field being "1" indicates that the Ethernet header compression function is performed.

A value range of Context ID is [0, maxethernetID-1], where maxethernetID is configured by using RRC. The Context ID field uniquely identifies one data stream, such as a data stream corresponding to a specific source MAC address/destination MAC address combination, and the Context ID is associated with a compression context corresponding to the specific source MAC address/destination MAC address combination.

The L field is used to indicate a length of newly added (or additionally introduced) bytes relative to a legacy PDCP sub-header.

The Check field is used to verify the Ethernet field, to ensure that the receiving end can successfully obtain a correct Ethernet header through decompression. The Check field is obtained through calculation by using a specific algorithm based on all Ethernet fields currently reported, and the specific algorithm is defined by the protocol or configured through negotiation between the network device and the terminal.

The F1, F2, or F3 field is used to indicate whether a specific Ethernet field in the Ethernet header is reused. For example, F1 corresponds to the source MAC address field in the Ethernet header, F2 corresponds to the destination MAC address field in the Ethernet header, and F3 corresponds to the typefield in the Ethernet header.

For example, when a value of the F1, F2, or F3 field is "1", it indicates that the F1, F2, or F3 field is reused. It can be understood that if an Ethernet field in a packet transmitted this time is the same as an Ethernet field in a packet previously transmitted, a corresponding Ethernet field is no longer carried in the Ethernet header of the packet transmitted this time.

When the value of the F1, F2, or F3 field is "0", it indicates that the Ethernet field corresponding to the F1, F2, or F3 field is not reused, and a corresponding Ethernet field is carried in the Ethernet header of the packet transmitted this time.

Step 2.2: If the Ethernet header compression function is disabled for one DRB, a PDCP entity corresponding to the DRB performs data transmission in the legacy PDCP data PDU format.

For example, a PDCP SN size is equal to 12 bits, and the corresponding PDCP data PDU format is shown in FIG. 9.

The F field is used to indicate whether the Ethernet header compression function is performed on the packet. For example, a value of the F field being "0" indicates that the Ethernet header compression function is not performed, and the value of the F field being "1" indicates that the Ethernet header compression function is performed.

Step 3: The receiving PDCP entity receives data corresponding to one DRB from a bottom layer (RLC). If the DRB is configured with the Ethernet header compression function, when it is determined to deliver the data packet to the upper layer (SDAP), the Ethernet header is decompressed, and the corresponding processing behavior is as follows:

Step 3.1: If a corresponding Ethernet decompression context has not been established for a context ID carried in a header of the PDCP data PDU, establish the Ethernet header decompression context and associate the Ethernet header decompression context with the context ID; and if verification of the check field is successful, obtain an original Ethernet header based on the Ethernet field carried in the header of the PDCP data PDU, and update the Ethernet header decompression context.

Step 3.2: If the receiving PDCP entity has established a corresponding Ethernet decompression context for the context ID carried in the header of the PDCP data PDU, extract a stored reused Ethernet field from the decompression context corresponding to the context ID, and verify the check field based on the reused Ethernet field and an un-reused Ethernet field carried in the PDCP SDU; and if verification is successful, obtain the original Ethernet header, and update the decompression context corresponding to the context ID.

Step 3.3: The receiving PDCP entity feeds back Ethernet header decompression status feedback information to the transmitting PDCP entity.

For a format of the Ethernet header decompression status feedback information, refer to FIG. 7. FIG. 7 illustrates a PDCP control PDU for Ethernet.

Context ID uniquely identifies a specific MAC source or MAC destination combination.

The A field indicates whether the receiving PDCP entity has successfully decompressed the Ethernet header. For example, a value of the A field being "1" indicates successful decompression, and the value of the A field being "0" indicates a decompression failure.

Step 4: The transmitting PDCP entity receives, from the bottom layer, a PDCP control PDU that contains an Ethernet header compression feedback, and the corresponding processing behavior is as follows:

If the feedback indicates that the Ethernet header has not been successfully decompressed, the transmitting PDCP entity needs to reset all Ethernet reuse indicator fields, for example, sets to 0.

An embodiment of this disclosure further provides a transmitting end. A problem resolving principle of the transmitting end is similar to the header compression processing method in the embodiments of this disclosure; therefore, implementation of the transmitting end may be referred to implementation of the method, and details are not repeated herein.

Figure 10:
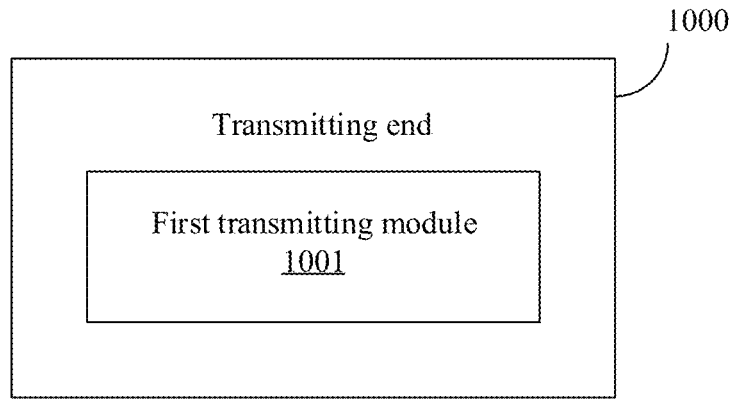
FIG. 10 is a schematic structural diagram of a transmitting end according to an embodiment of this disclosure.

Referring to FIG. 10, an embodiment of this disclosure provides a transmitting end. The transmitting end 1000 includes:

a first transmitting module 1001, configured to transmit, by using a transmitting PDCP entity of the transmitting end, a first PDCP PDU corresponding to a first DRB.

When the first DRB is configured with an Ethernet header compression function, the first PDCP PDU includes one or more pieces of first information, where the first information is used to indicate whether a specific Ethernet field in an Ethernet header of a first PDCP SDU corresponding to the first PDCP PDU is reused.

The first PDCP PDU may be a PDCP PDU, and the first PDCP SDU may be a PDCP SDU corresponding to the PDCP PDU.

In this embodiment of this disclosure, optionally, when the transmitting end is a terminal, the transmitting end further includes:

a first receiving module, configured to: receive a configuration message before the first transmitting module transmits, by using the transmitting PDCP entity of the transmitting end, the first PDCP PDU corresponding to the first DRB.

The configuration message includes any combination of one or more of the following:

second information, used for indicating to configure an Ethernet header compression function of a second DRB; and third information, used for indicating to disable an Ethernet header compression function of a third DRB.

In this embodiment of this disclosure, optionally, the Ethernet header compression function is configured when the second DRB is established; or the Ethernet header compression function is disabled when the third DRB is released; or a time point for enabling the Ethernet header compression function of the second DRB is any time point after the second DRB is established; or a time point for disabling the Ethernet header compression function of the third DRB is any time point before the third DRB is released.

In this embodiment of this disclosure, optionally, the Ethernet header compression function is not configured for the second DRB when a receiving PDCP entity corresponding to the second DRB is configured with an out-of-order delivery function.

In this embodiment of this disclosure, optionally, the transmitting end further includes:

a second receiving module, configured to receive, by using a receiving PDCP entity of the transmitting end, Ethernet header decompression status feedback information after the first transmitting module transmits, by using the transmitting PDCP entity of the transmitting end, the first PDCP PDU corresponding to the first DRB.

In this embodiment of this disclosure, optionally, the first transmitting module 1001 is further configured to: if the Ethernet header decompression status feedback information indicates that the Ethernet header is not successfully decompressed, transmitting a second PDCP PDU, where a PDCP sub-header of the second PDCP PDU includes one or more pieces of fifth information, and the fifth information is used to indicate that a specific Ethernet field in an Ethernet header of a second PDCP SDU is not reused, and the second PDCP SDU corresponds to the second PDCP PDU.

In this embodiment of this disclosure, optionally, the first PDCP PDU further includes one or more of the following:

sixth information, used for identifying a data stream corresponding to the first PDCP PDU;

seventh information, used for indicating a length of bytes newly added relative to a legacy PDCP sub-header;

eighth information, used for verifying the Ethernet field; and ninth information, used for indicating whether the Ethernet header compression function is performed on the first PDCP PDU.

In this embodiment of this disclosure, optionally, the eighth information is obtained through calculation by using a specific algorithm based on all Ethernet fields in the Ethernet header of the first PDCP SDU, and the specific algorithm is defined by the protocol or configured through negotiation between a network device and a terminal.

In this embodiment of this disclosure, optionally, a format of the first PDCP PDU is a legacy PDCP data format when the Ethernet header compression function is disabled for the first DRB.

The transmitting end provided in this embodiment of this disclosure may execute the foregoing method embodiments, implementation principles and technical effects thereof are similar, and details are not described herein again.

An embodiment of this disclosure further provides a receiving end. A problem resolving principle of the receiving end is similar to the header decompression processing method in the embodiments of this disclosure; therefore, implementation of the receiving end may be referred to implementation of the method, and details are not repeated herein.

Figure 11:
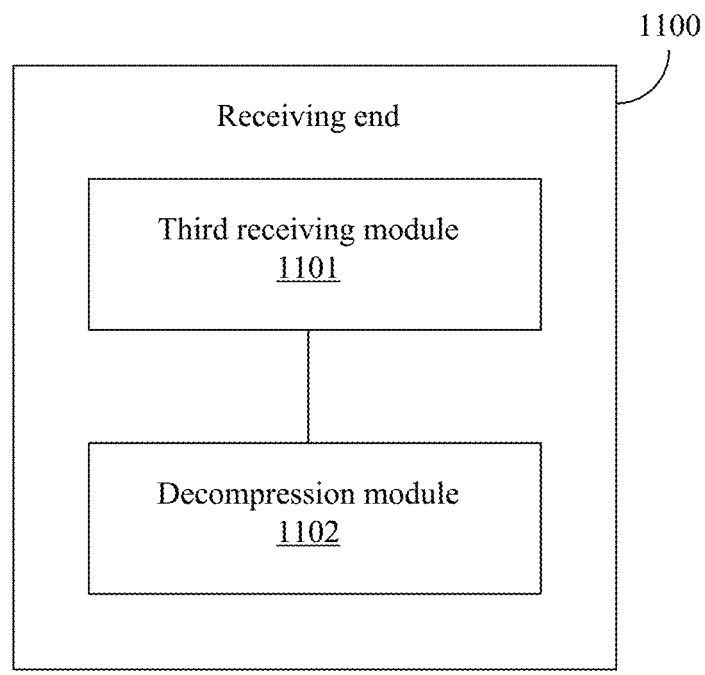
FIG. 11 is a schematic structural diagram of a receiving end according to an embodiment of this disclosure.

Referring to FIG. 11, an embodiment of this disclosure provides a receiving end. The receiving end 1100 includes:

a third receiving module 1101, configured to receive, by using a receiving PDCP entity of the receiving end, a first PDCP PDU corresponding to a first DRB; and a decompression module 1102, configured to perform Ethernet header decompression processing on the first PDCP PDU when the first DRB is configured with an Ethernet header compression function.

A PDCP sub-header of the first PDCP PDU includes one or more pieces of first information, and the first information is used to indicate whether a specific Ethernet field in an Ethernet header of a first PDCP SDU corresponding to the first PDCP PDU is reused.

In this embodiment of this disclosure, optionally, the receiving end further includes:

a second transmitting module, configured to feed back Ethernet header decompression status feedback information by using a transmitting PDCP entity of the receiving end.

In this embodiment of this disclosure, optionally, when the receiving end is a network device, the receiving end further includes:

a third transmitting module, configured to: transmit a configuration message before the third receiving module receives, by using the receiving PDCP entity of the receiving end, the first PDCP PDU corresponding to the first DRB.

The configuration message includes any combination of one or more of the following:

second information, used for indicating to configure an Ethernet header compression function of a second DRB; and third information, used for indicating to disable an Ethernet header compression function of a third DRB.

In this embodiment of this disclosure, optionally, the Ethernet header compression function is configured when the second DRB is established; or the Ethernet header compression function is disabled when the third DRB is released; or a time point for enabling the Ethernet header compression function of the second DRB is any time point after the second DRB is established; or a time point for disabling the Ethernet header compression function of the third DRB is any time point before the third DRB is released.

In this embodiment of this disclosure, optionally, the Ethernet header compression function is not configured for the second DRB when a receiving PDCP entity corresponding to the second DRB is configured with an out-of-order delivery function.

In this embodiment of this disclosure, optionally, the PDCP sub-header of the first PDCP PDU further includes one or more of the following:

sixth information, used for identifying a data stream corresponding to the first PDCP PDU;

seventh information, used for indicating a length of bytes newly added relative to a legacy PDCP sub-header;

eighth information, used for verifying the Ethernet field; and ninth information, used for indicating whether the Ethernet header compression function is performed on the first PDCP PDU.

In this embodiment of this disclosure, optionally, the decompression module further executes at least one of the following:

establishing an Ethernet header decompression context associated with the sixth information;

performing verification on the seventh information based on an Ethernet field carried in a data field of the first PDCP PDU;

if verification on the eighth information is successful, obtaining the Ethernet header of the first PDCP SDU based on the Ethernet field carried in the data field of the first PDCP PDU, and updating the Ethernet header decompression context;

or obtaining a reused Ethernet field in the Ethernet header of the first PDCP SDU from the Ethernet header decompression context corresponding to the sixth information;

performing verification on the eighth information based on the reused Ethernet field in the Ethernet header of the first PDCP SDU and the Ethernet field carried in the data field of the first PDCP PDU; and if verification on the eighth information is successful, obtaining the Ethernet header of the first PDCP SDU based on the reused Ethernet field in the Ethernet header of the first PDCP SDU and the Ethernet field carried in the data field of the first PDCP PDU, and updating the Ethernet header decompression context corresponding to the sixth information.

The receiving end provided in this embodiment of this disclosure may execute the foregoing method embodiments, implementation principles and technical effects thereof are similar, and details are not described herein again.

Figure 12:
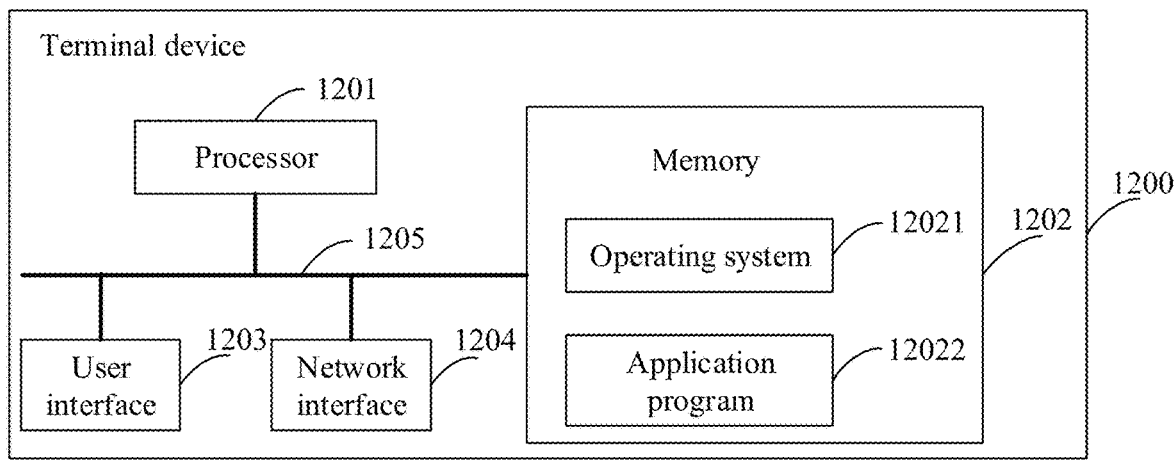
FIG. 12 is a structural diagram of a terminal according to an embodiment of this disclosure.

As shown in FIG. 12, the terminal 1200 shown in FIG. 12 includes at least one processor 1201, a memory 1202, at least one network interface 1204, and a user interface 1203. The components of the terminal 1200 are coupled together by using a bus system 1205. It can be understood that the bus system 1205 is configured to implement connection communication between these components. The bus system 1205 may include not only a data bus but also a power supply bus, a control bus, and a status signal bus. However, for clarity of description, various types of buses in FIG. 12 are marked as the bus system 1205.

The user interface 1203 may include a display, a keyboard, a click device (for example, a mouse or a trackball), a touch board, or a touchscreen.

It can be understood that the memory 1202 in this embodiment of this disclosure may be a volatile memory or a nonvolatile memory, or may include both a volatile memory and a nonvolatile memory. The non-volatile memory may be a read-only memory (ROM), a programmable read only memory (Programmable ROM, PROM), an erasable programmable read-only memory (Erasable PROM, EPROM), and an electrically erasable programmable read-only memory (Electrically EPROM, EEPROM), or flash memory. The volatile memory may be a random access memory (RAM), and the RAM is used as an external cache. For illustrative rather than limitative description, many forms of RAMs are available, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synchlink DRAM, SLDRAM), and a direct memory bus random access memory (Direct Rambus RAM, DRRAM). The memory 1202 in the system and method described in the embodiments of this disclosure is intended to include but is not limited to these and any other suitable types of memories.

In some implementations, the memory 1202 stores the following elements: an executable module or a data structure, or a subset thereof, or an extended set thereof: an operating system 12021 and an application program 12022.

An operating system 12021 includes various system programs, such as a framework layer, a kernel library layer, and a driver layer, and is configured to implement various basic services and process hardware-based tasks. The application program 12022 includes various application programs, such as a media player and a browser, and is configured to implement various application services. A program that implements the methods of the embodiments of this disclosure may be included in the application program 12022.

In an embodiment of this disclosure, a program or instruction stored in the memory 1202, specifically, a program or instruction stored in the application program 12022 is invoked, and the following steps are implemented during execution of the program or instruction: transmitting, by using a transmitting PDCP entity of a transmitting end, a first PDCP PDU corresponding to a first DRB; where when the first DRB is configured with an Ethernet header compression function, a PDCP sub-header of the first PDCP PDU includes one or more pieces of first information, and the first information is used to indicate whether a specific Ethernet field in an Ethernet header of a first PDCP SDU corresponding to the first PDCP PDU is reused.

In another embodiment of this disclosure, a program or instruction stored in the memory 1202, specifically, a program or instruction stored in the application program 12022 is invoked, and the following steps are implemented during execution of the program or instruction: receiving, by using a receiving PDCP entity of the receiving end, a first PDCP PDU corresponding to a first DRB; and performing Ethernet header decompression processing on the first PDCP PDU when the first DRB is configured with an Ethernet header compression function, where a PDCP sub-header of the first PDCP PDU includes one or more pieces of first information, and the first information is used to indicate whether a specific Ethernet field in an Ethernet header of a first PDCP SDU corresponding to the first PDCP PDU is reused.

The terminal provided in this embodiment of this disclosure may execute the foregoing method embodiments, implementation principles and technical effects thereof are similar, and details are not described herein again.

Figure 13:
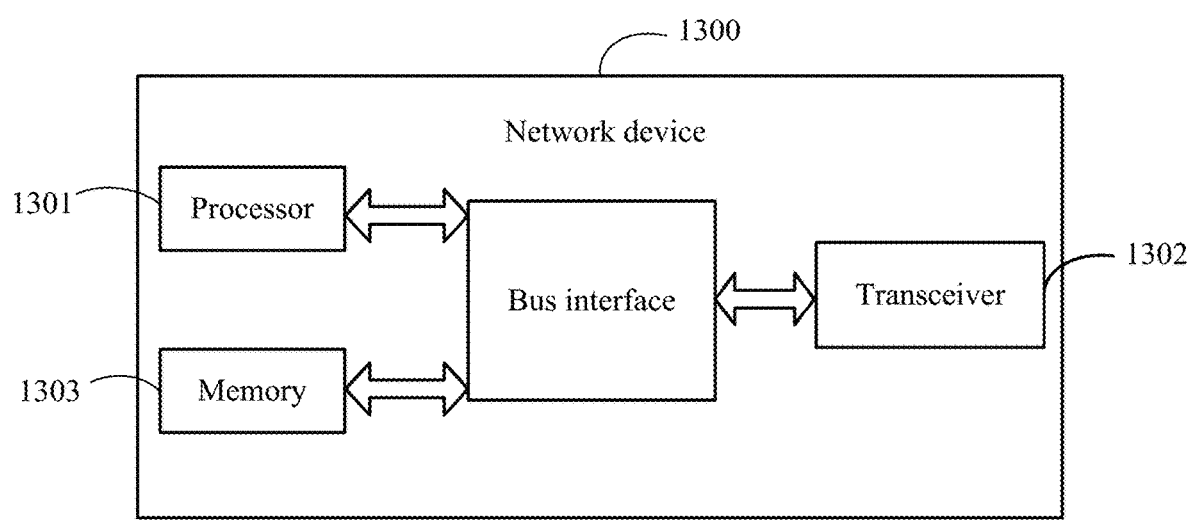
FIG. 13 is a structural diagram of a network device according to an embodiment of this disclosure.

FIG. 13 is a structural diagram of a network device applied to an embodiment of this disclosure. As shown in FIG. 13, the network device 1300 includes a processor 1301, a transceiver 1302, a memory 1303, and a bus interface.

In an embodiment of this disclosure, the network device 1300 further includes: a program stored in the memory 1303 and capable of running on the processor 1301, and when the program is executed by the processor 1301, the following steps are implemented: transmitting, by using a transmitting PDCP entity of a transmitting end, a first PDCP PDU corresponding to a first DRB; where when the first DRB is configured with an Ethernet header compression function, a PDCP sub-header of the first PDCP PDU includes one or more pieces of first information, and the first information is used to indicate whether a specific Ethernet field in an Ethernet header of a first PDCP SDU corresponding to the first PDCP PDU is reused.

In another embodiment of this disclosure, the network device 1300 further includes: a program stored in the memory 1303 and capable of running on the processor 1301, and when the program is executed by the processor 1301, the following steps are implemented: receiving, by using a receiving PDCP entity of the receiving end, a first PDCP PDU corresponding to a first DRB; and performing Ethernet header decompression processing on the first PDCP PDU when the first DRB is configured with an Ethernet header compression function, where a PDCP sub-header of the first PDCP PDU includes one or more pieces of first information, and the first information is used to indicate whether a specific Ethernet field in an Ethernet header of a first PDCP SDU corresponding to the first PDCP PDU is reused.

In FIG. 13, a bus architecture may include any quantity of interconnected buses and bridges, specifically for interconnecting various circuits of one or more processors represented by the processor 1301 and a memory represented by the memory 1303. The bus architecture may further interconnect various other circuits such as a peripheral device, a voltage regulator, and a power management circuit. These are all well known in the art, and therefore are not further described in this specification. The bus interface provides an interface. The transceiver 1302 may be a plurality of components, that is, the transceiver 1302 includes a transmitter and a receiver, and provides a unit for communicating with various other apparatuses on a transmission medium.

The processor 1301 is responsible for bus architecture management and general processing. The memory 1303 may store data used when the processor 1301 performs an operation.

The network device provided in this embodiment of this disclosure may execute the foregoing method embodiments, implementation principles and technical effects thereof are similar, and details are not described herein again.

Method or algorithm steps described with reference to the content disclosed in this disclosure may be implemented by hardware, or may be implemented by a processor by executing a software instruction. The software instruction may include a corresponding software module. The software module may be stored in a RAM, a flash memory, a ROM, an EPROM, an EEPROM, a register, a hard disk, a removable hard disk, a compact disc read-only memory, or a storage medium in any other forms well-known in the art. For example, a storage medium is coupled to a processor, so that the processor can read information from the storage medium or write information into the storage medium. Certainly, the storage medium may alternatively be a component of the processor. The processor and the storage medium may be located in the ASIC. In addition, the ASIC may be located in a core network interface device. Certainly, the processor and the storage medium may alternatively exist in the core network interface device as discrete components.

A person skilled in the art should be aware that, in the foregoing one or more examples, functions described in this disclosure may be implemented by hardware, software, firmware, or any combination thereof. When the functions are implemented by software, the functions may be stored in a computer-readable medium or transmitted as one or more instructions or code in the computer-readable medium. The computer-readable medium includes a computer storage medium and a communications medium, where the communications medium includes any medium that enables a program to be transmitted from one place to another. The storage medium may be any available medium accessible to a general-purpose or dedicated computer.

The objectives, technical solutions, and beneficial effects of this disclosure are further described in detail in the foregoing specific embodiments. It should be understood that the foregoing descriptions are merely specific embodiments of this disclosure, but are not intended to limit the protection scope of this disclosure. Any modification, equivalent replacement, or improvement made based on the technical solutions of this disclosure shall fall within the protection scope of this disclosure.

A person skilled in the art should understand that the embodiments of this disclosure may be provided as a method, a system, or a program product. Therefore, the embodiments of this disclosure may use a form of hardware only embodiments, software only embodiments, or embodiments with a combination of software and hardware. Moreover, the embodiments of this disclosure may use a form of a program product that is implemented on one or more computer-usable storage media (including but not limited to a disk memory, a CD-ROM, an optical memory, and the like) that include computer-usable program code.

The embodiments of this disclosure are described with reference to the flowcharts and/or block diagrams of the method, the device (system), and the program product according to the embodiments of this disclosure. It should be understood that program instructions may be used to implement each process and/or each block in the flowcharts and/or the block diagrams, or a combination of a process and/or a block in the flowcharts and/or the block diagrams. These program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of this disclosure without departing from the spirit and scope of this disclosure. This disclosure is intended to cover these modifications and variations provided that they fall within the scope of protection defined by the following claims and their equivalent technologies.

What is claimed is:

1. An Ethernet header compression method, applied to a transmitting end and comprising:
receiving a configuration message; wherein the configuration message comprises second information, used for indicating to configure an Ethernet header compression function of a data radio bearer DRB; and
transmitting, by using a transmitting packet data aggregation protocol PDCP entity of the transmitting end, a first PDCP protocol data unit PDU corresponding to the data radio bearer DRB; wherein
the first PDCP PDU comprises one or more pieces of first information and sixth information used for identifying a data stream corresponding to the first PDCP PDU, wherein the first information is used to indicate whether a specific Ethernet field in an Ethernet header of a first PDCP SDU is compressed, and the first PDCP SDU corresponds to the first PDCP PDU;
wherein the first PDCP PDU further comprises one or more of the following:
seventh information, used for indicating a length of bytes newly added relative to a legacy PDCP sub-header;
eighth information, used for verifying the Ethernet field; and
ninth information, used for indicating whether the Ethernet header compression function is performed on the first PDCP PDU.

2. The method according to claim 1, wherein the transmitting end is a terminal,
the configuration message further comprises:
third information, used for indicating to disable an Ethernet header compression function of a DRB.

3. The method according to claim 2, wherein
the Ethernet header compression function is configured when the DRB is established;
or
the Ethernet header compression function is disabled when the DRB is released;
or a time point for enabling the Ethernet header compression function of the DRB is any time point after the DRB is established;
or
a time point for disabling the Ethernet header compression function of the DRB is any time point before the DRB is released.

4. The method according to claim 2, wherein the Ethernet header compression function is not configured for the DRB when a receiving PDCP entity corresponding to the DRB is configured with an out-of-order delivery function.

5. The method according to claim 1, wherein after the transmitting, by using a transmitting PDCP entity of the transmitting end, a first PDCP PDU corresponding to the DRB, the method further comprises:
receiving, by using a receiving PDCP entity of the transmitting end, Ethernet header decompression status feedback information.

6. The method according to claim 5, wherein after the receiving, by using a receiving PDCP entity of the transmitting end, Ethernet header decompression status feedback information, the method further comprises:
if the Ethernet header decompression status feedback information indicates that the Ethernet header is not successfully decompressed, transmitting a second PDCP PDU, wherein a PDCP sub-header of the second PDCP PDU comprises one or more pieces of fifth information, and the fifth information is used to indicate that a specific Ethernet field in an Ethernet header of a second PDCP SDU is not reused, and the second PDCP SDU corresponds to the second PDCP PDU.

7. The method according to claim 1, wherein the eighth information is obtained through calculation by using a specific algorithm based on all Ethernet fields in the Ethernet header of the first PDCP SDU, and the specific algorithm is defined by the protocol or configured through negotiation between a network device and a terminal.

8. The method according to claim 1, wherein a format of the first PDCP PDU is a legacy PDCP data format when the Ethernet header compression function is disabled for the DRB; or
when the Ethernet header compression function is disabled for the DRB, the first PDCP PDU comprises tenth information used for indicating whether the Ethernet header compression function is performed on the first PDCP PDU.

9. An Ethernet header decompression method, applied to a receiving end, wherein the method comprises:
transmitting a configuration message; wherein the configuration message comprises second information, used for indicating to configure an Ethernet header compression function of a data radio bearer DRB; and
receiving, by using a receiving packet data aggregation protocol PDCP entity of the receiving end, a first PDCP protocol data unit PDU corresponding to the data radio bearer DRB; and
performing Ethernet header decompression processing on the first PDCP PDU, wherein
the first PDCP PDU comprises one or more pieces of first information and sixth information used for identifying a data stream corresponding to the first PDCP PDU, and the first information is used to indicate whether a specific Ethernet field in an Ethernet header of a first PDCP service data unit SDU corresponding to the first PDCP PDU is compressed;
wherein the first PDCP PDU further comprises one or more of the following:

seventh information, used for indicating a length of bytes newly added relative to a legacy PDCP sub-header;

eighth information, used for verifying the Ethernet field; and ninth information, used for indicating whether the Ethernet header compression function is performed on the first PDCP PDU.

10. The method according to claim 9, wherein after the performing Ethernet header decompression processing on the first PDCP PDU, the method further comprises:

feeding back Ethernet header decompression status feedback information by using a transmitting PDCP entity of the receiving end.

11. The method according to claim 9, wherein the receiving end is a network device, the configuration message further comprises:

third information, used for indicating to disable an Ethernet header compression function of a DRB.

12. The method according to claim 11, wherein the Ethernet header compression function is configured when the DRB is established;

or the Ethernet header compression function is disabled when the DRB is released;

or a time point for enabling the Ethernet header compression function of the DRB is any time point after the DRB is established;

or a time point for disabling the Ethernet header compression function of the DRB is any time point before the DRB is released.

13. The method according to claim 11, wherein the Ethernet header compression function is not configured for the DRB when a receiving PDCP entity corresponding to the DRB is configured with an out-of-order delivery function.

14. The method according to claim 9, wherein the performing Ethernet header decompression processing on the first PDCP PDU comprises:

establishing an Ethernet header decompression context associated with the sixth information;

or obtaining a reused Ethernet field in the Ethernet header of the first PDCP SDU from the Ethernet header decompression context corresponding to the sixth information.

15. The method according to claim 14, wherein in case that the performing Ethernet header decompression processing on the first PDCP PDU comprises establishing an Ethernet header decompression context associated with the sixth information, the method further comprises:

performing verification on the eighth information based on an Ethernet field carried in a data field of the first PDCP PDU;

if verification on the eighth information is successful, obtaining the Ethernet header of the first PDCP SDU based on the Ethernet field carried in the data field of the first PDCP PDU, and updating the Ethernet header decompression context.

16. The method according to claim 14, wherein in case that the performing Ethernet header decompression processing on the first PDCP PDU comprises obtaining a reused Ethernet field in the Ethernet header of the first PDCP SDU from the Ethernet header decompression context corresponding to the sixth information, the method further comprises:

performing verification on the eighth information based on the reused Ethernet field in the Ethernet header of the first PDCP SDU and the Ethernet field carried in the data field of the first PDCP PDU; and if verification on the eighth information is successful, obtaining the Ethernet header of the first PDCP SDU based on the reused Ethernet field in the Ethernet header of the first PDCP SDU and the Ethernet field carried in the data field of the first PDCP PDU, and updating the Ethernet header decompression context corresponding to the sixth information.

17. A transmitting end, comprising a processor, a memory, and a program stored in the memory and capable of running on the processor, wherein the program is executed by the processor to perform steps of:

receiving a configuration message; wherein the configuration message comprises second information, used for indicating to configure an Ethernet header compression function of a data radio bearer DRB; and transmitting, by using a transmitting packet data aggregation protocol PDCP entity of the transmitting end, a first PDCP protocol data unit PDU corresponding to the data radio bearer DRB; wherein the first PDCP PDU comprises one or more pieces of first information and sixth information used for identifying a data stream corresponding to the first PDCP PDU, wherein the first information is used to indicate whether a specific Ethernet field in an Ethernet header of a first PDCP SDU is compressed, and the first PDCP SDU corresponds to the first PDCP PDU;

wherein the first PDCP PDU further comprises one or more of the following:

seventh information, used for indicating a length of bytes newly added relative to a legacy PDCP sub-header;

eighth information, used for verifying the Ethernet field; and ninth information, used for indicating whether the Ethernet header compression function is performed on the first PDCP PDU.

18. The transmitting end according to claim 17, wherein the transmitting end is a terminal, the configuration message further comprises:

third information, used for indicating to disable an Ethernet header compression function of a DRB.

* * * * *